June 21, 1955
W. E. HULL ET AL
2,711,169
PRESSURE RELIEF SYSTEM INCORPORATING
AN AUTOMATIC RELIEF VALVE
Filed Sept. 9, 1952
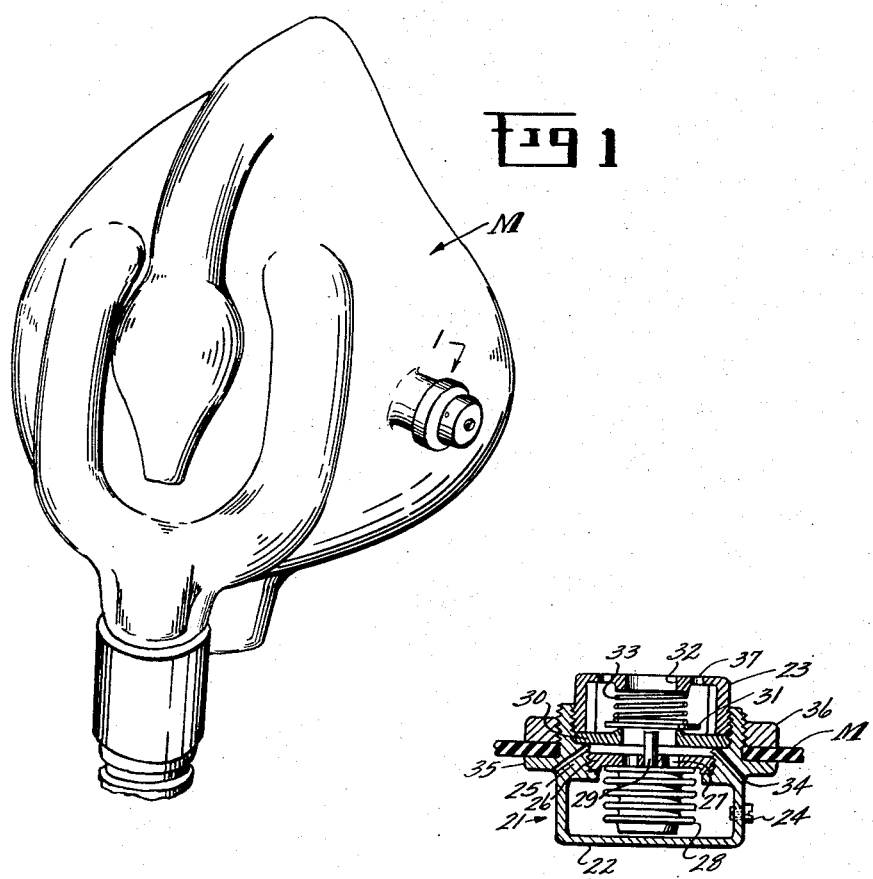
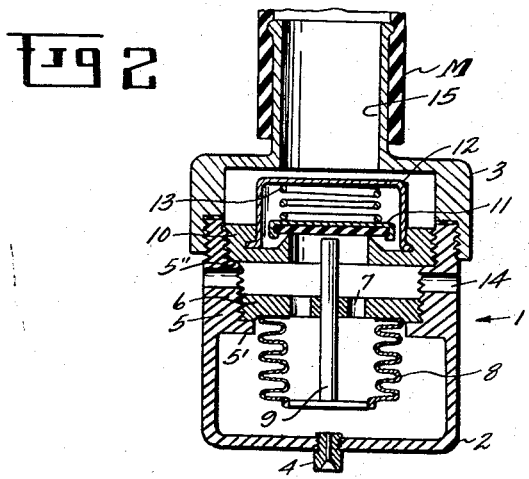
INVENTORS.
WAYLAND E. HULL
HENRY SEELER
BY
Wade Korntz
Jerome P. Bloom
ATTORNEYS

2,711,169

PRESSURE RELIEF SYSTEM INCORPORATING AN AUTOMATIC RELIEF VALVE

Wayland E. Hull, Durham, N. C., and Henry Seeler, Dayton, Ohio, assignors to the United States of America as represented by the Secretary of the Air Force Application September 9, 1952, Serial No. 308,728

7 Claims. (Cl. 128—141)

(Granted under Title 35, U. S. Code (1952), sec. 266)

The invention described herein may be manufactured and used by or for the Government for governmental purposes without payment to us of any royalty thereon.

This invention relates to an improved automatic relief valve particularly adaptable for use in venting an oxygen mask, or a pressurized suit to the surrounding atmosphere. For example, in high altitude flying, at about 30 thousand feet or more, of necessity the cabin must be pressurized and the occupants will be wearing oxygen masks. Due to various reasons such as the cabin being pierced by gun fire, or a structural failure of the hatch cover, or some other similar structural failure there may be an explosive loss of cabin pressure. Ordinarily this sudden loss of pressure will cause an immediate ballooning of the mask wall and prevent proper functioning with accompanying discomfort and danger to the wearer. This problem has been recognized for some time to be one of a serious nature but applicants believe they are the first to provide a satisfactory solution to the problem.

An object of this invention is to provide an improved automatic relief valve in a new combination with an oxygen mask so as to furnish adequate protection to the wearer against the danger inherent in the use of the mask where there is a sudden drop in external pressure.

A further object of this invention is to provide an improved automatic relief valve where in the construction has been substantially simplified with consequent assurance of positive and proper functioning thereof.

Another object of the invention is to provide an improved safety valve adapted for use under conditions wherein it is vital to maintain a balanced pressure system.

Other objects and advantages of the invention will become readily apparent from the following description taken in conjunction with the accompanying drawings.

Figure 1 of the drawings shows, diagrammatically, the improved automatic relief valve in combination with an oxygen mask.

Figure 2 of the drawings shows, in cross section, a preferred form of the improved automatic relief valve.

Figure 3 of the drawings shows in cross section a slightly modified form of the improved automatic relief valve shown in Figure 2.

Referring to Figure 2 the improved automatic relief valve includes a valve housing 1 having a fitting 3 secured to the casing 2 by any suitable means, for example, by means of a threaded engagement. The casing 2 is closed at one end, which end has a small bleed hole fitting therein, and open at the other end. The casing 2 is also provided with an internal stepped flange 5 having step portions 5' and 5". A plate or disc 6 having holes 7 therethrough is seated on the flange 5' in threaded engagement with the casing 2. An aneroid bellows 8 is secured to one face of the disc, the free end of the bellows having a valve actuating rod 9 secured thereto which rod extends through the plate 6. A valve seat 10 is seated on flange step 5" adjacent the open end of the casing 2 and secured to the casing in any suitable manner. A valve 11 is normally seated on the valve seat 10 and held in engagement therewith by a spider or bridge 12 connected to the valve seat having a central portion spaced therefrom and a coil spring 13 is interposed between the spider or bridge and the valve. Intermediate the spaced stepped flange portions in the casing 2 are provided openings 14 communicating with the ambient atmosphere and the bellows through the openings 7 in the disc 6. The fitting 3 which is secured to the casing 2 has a neck portion of reduced diameter adapted to be engaged in an oxygen mask in sealing relation therewith.

An example of the operation of the improved automatic relief valve when used in conjunction with an oxygen mask or some similar device is as follows. When an oxygen mask is worn in a pressurized cabin which has a structural failure resulting in a consequent reduction of pressure therein, there is a sudden loss of pressure externally of the oxygen mask. At such time the inside of the aneroid bellows is immediately exposed to the consequent low pressure through the openings 14 in the casing 2 and the holes 7 in the disc 6, whereas surrounding the bellows externally within the case, noting Figure 2 of the drawings, there is the original cabin pressure. The resulting pressure differential will cause the bellows to collapse and the valve actuating rod is accordingly moved thereby to open the valve 11. The bleed fitting 4 in the casing 2 will slowly permit the pressure externally surrounding the bellows to be reduced to the low pressure external of the oxygen mask. Resultingly, the pressure differential on the aneroid bellows is reduced and cancelled and the spring 13 will return the valve 11 to a closed position.

The bleed fitting 4 may be a screw with a narrow hole drilled centrally thereof or, preferably, a ceramic or powered metal plug which is porous and will not admit dust or other foreign matter.

The modified form of the invention shown in Figure 3 includes a casing 22 having a bleed fitting 24 and a stepped flange 25 similar in nature to that shown in the preferred form of the improved automatic relief valve previously described. A perforated plate 26 having holes 27 therein is located on the lowermost step of the flange as shown in Figure 3 in threaded engagement with the casing 22. A bellows 28 is secured to the plate on one face thereof and a valve actuating rod 29 is connected to the extremity of the bellows and extends through the plate. A valve seat 30 is seated on the uppermost flange step in threaded engagement with the casing. The fitting 23 is arranged concentrically of the casing in threaded engagement therewith and has openings 37 therein and projection 32 inwardly thereof. A valve 31 is seated on a valve seat 30 and a spring 33 is interposed between the projection 32 and the valve to normally urge said valve into closed position. The casing has an external flange 35. In use the casing is inserted in an oxygen mask wall opening until the wall abuts the flange 35 then a securing means 36 clamps the mask wall against the flange 35. The casing further has openings 34 from adjacent the external flange 35 to the interior of the casing intermediate the plate and the valve seat which function as the openings 14 in the preferred form of the automatic relief valve shown in Fig. 2.

The operation of the slightly modified form of the improved automatic relief valve as shown in Figure 3 is identical with that of the preferred embodiment of the invention shown in Figure 2 and described previously herein.

While preferred embodiments of the invention have been shown and described herein nothing should be so construed to limit the invention to the particular embodiments set forth since various modifications and applications thereof should be readily apparent to one skilled in the art and such lies within the scope of the appended claims.

What we claim is:

1. A safety valve comprising a valve casing having an opening at one end thereof, a resiliently mounted valve means seated therein and normally sealing the opening, pressure responsive valve control means mounted in said casing intermediate the valve means and the other end of the casing, said casing having additional openings in the side thereof adjacent to and communicating with the pressure responsive control means, and means providing a bleed hole located in the other end of the casing whereby on a reduction of pressure external of said casing said change of pressure will be communicated through said casing side openings to the pressure responsive control means to open the valve means.

2. The structure as set forth in claim 1 wherein the pressure responsive control means comprises a bellows having means connected to one end thereof extending to a point adjacent the valve means whereby on reduction of external pressure, the bellows will respond to activate the means connected thereto to unseat the valve.

3. A breathing system automatic relief valve comprising a casing open at one end thereof, valve means seated in said opening and normally closing said open end, said valve means comprising a valve, retaining means connected to the casing and spaced from said valve, spring means interposed between the valve and the retaining means normally holding said valve in closed position so as to seal the opening in the casing, additional openings in the side of the casing adjacent the open end thereof intermediate the valve means and the other end of the casing, pressure responsive control means mounted in said casing intermediate the side openings and said other end thereof and operatively associated with the valve, and means providing a bleed hole located in said other end of the casing.

4. In a breathing system, an oxygen mask, a fitting having a passage therethrough connected to said mask, a valve casing secured to the fitting and having one end thereof open to the fitting, a valve means, resilient means connected to said casing and associated with the valve means normally holding the valve means in sealing relation with the opening in the valve casing, additional openings in the side of the valve casing, pressure responsive valve control means mounted in said casing intermediate the side openings and the other end of the casing and operatively associated with the valve means, and means providing a bleed hole at the other end of the casing whereby on reduction of external pressure, such change will be communicated to the pressure responsive valve control means through said additional openings to open the valve means whereby a balance of pressure may obtain.

5. A safety valve comprising a valve casing having an opening at one end thereof, spring urged valve means normally closing said opening, additional openings in the side of the casing adjacent said valve means and intermediate said valve means and the other end of the casing, a perforated plate mounted intermediate said openings and said other end of said casing, pressure responsive valve control means connected to said plate and operatively associated with said valve means whereby on reduction of external pressure said control means will respond to actuate said valve means.

6. A safety valve comprising a valve casing having a stepped internal flange adjacent an opening at one end thereof, a valve seat having an opening therein mounted in the casing opening, a valve, a valve retaining means connected to said valve seat, a spring interposed between said retaining means and said valve to normally urge said valve to closed position, additional openings in the side of said valve casing intermediate the flange steps, a perforated plate mounted on the lowermost flange step adjacent the side openings, a bellows connected to said plate at one end thereof, a valve actuating means connected to the other end of said bellows and extending through said plate to a point adjacent the valve, means providing a bleed hole located in said casing at the other end thereof whereby on reduction of external pressure, such change is communicated through the casing side openings and plate perforations to the bellows which responds to open the valve to obtain a balance of pressure.

7. A safety valve comprising a valve casing open at one end thereof, valve means normally sealing such opening, differential pressure responsive valve control means mounted in said casing forming a closed chamber at the other end of such casing, additional openings in said valve casing intermediate said valve means and valve control means and means providing a bleed hole in said other end of the casing openings to said closed chamber whereby on reduction of pressure external of said casing such change of pressure will be communicated through said additional openings to actuate the valve control means to open the valve means, the bleed hole slowly providing a balance pressure to the closed chamber to permit the valve control means to return to a normal position closing the valve means.

References Cited in the file of this patent

UNITED STATES PATENTS

| 2,312,063 | Allen | Feb. 23, 1943 |
| 2,387,123 | Deming | Oct. 16, 1945 |
| 2,390,233 | Akerman | Dec. 4, 1945 |
| 2,510,976 | Herrala | June 13, 1950 |
| 2,583,502 | Wiggins | Jan. 22, 1952 |
| 2,632,374 | Klemperer | Mar. 24, 1953 |

FOREIGN PATENTS

| 119,381 | Sweden | Mar. 2, 1945 |